(12) United States Patent
Gamill et al.

(10) Patent No.: US 8,235,415 B2
(45) Date of Patent: Aug. 7, 2012

(54) TEXTILE GAS GUIDES FOR USE WITH INFLATABLE CUSHIONS

(75) Inventors: Kurt L. Gamill, Layton, UT (US); Bryan Walston, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 85 days.

(21) Appl. No.: 12/872,737

(22) Filed: Aug. 31, 2010

(65) Prior Publication Data

US 2012/0049496 A1    Mar. 1, 2012

(51) Int. Cl.
*B60R 21/232* (2011.01)
*B60R 21/26* (2011.01)
*B60R 21/262* (2011.01)

(52) U.S. Cl. ............ 280/730.2; 280/740; 280/742; 280/743.1

(58) Field of Classification Search .......... 280/730.2, 280/740, 742, 743.1
See application file for complete search history.

(56) References Cited

U.S. PATENT DOCUMENTS

| | | |
|---|---|---|
| 5,087,071 A | 2/1992 | Wallner et al. |
| 5,743,560 A | 4/1998 | Jackson et al. |
| 5,788,270 A | 8/1998 | Haland |
| 6,712,920 B2 | 3/2004 | Masuda et al. |
| 6,811,184 B2 | 11/2004 | Ikeda et al. |
| 6,848,708 B2 | 2/2005 | Green et al. |
| 7,195,280 B2 * | 3/2007 | Wheelwright et al. .... 280/743.1 |
| 7,264,268 B2 | 9/2007 | Ehrke |
| 7,562,902 B2 * | 7/2009 | Osterhout .................. 280/730.2 |
| 7,963,549 B2 * | 6/2011 | Schneider et al. ......... 280/728.2 |
| 2005/0269806 A1 | 12/2005 | Huber et al. |
| 2008/0224457 A1 | 9/2008 | Brough et al. |
| 2009/0295134 A1 * | 12/2009 | Wold et al. .................... 280/741 |
| 2010/0084841 A1 | 4/2010 | Suemitsu et al. |

FOREIGN PATENT DOCUMENTS

| | | |
|---|---|---|
| DE | 10 2004 006 317 B4 | 9/2005 |
| JP | 2009-83552 | 4/2009 |
| WO | WO 2005/076687 A2 | 8/2005 |
| WO | WO 2006/092226 A2 | 9/2006 |

* cited by examiner

*Primary Examiner* — Joseph Rocca
(74) *Attorney, Agent, or Firm* — Sally J. Brown; Madson IP

(57) ABSTRACT

Textile gas guides adapted for use with inflatable cushions and airbag systems are configured to be formed in a manner that reduces or eliminates the need for specialized equipment during manufacturing, and to be sufficiently reinforced to withstand damage during use. Such textile gas guides may comprise a second edge of a first fabric member overlapping and coupled with a shear seam to a portion of a third edge of a second fabric member. The third edge and a fourth edge of the second fabric member may be coupled together with a second seam sewed through the two edges of the second fabric member. The second fabric member at least substantially encompasses the first fabric member. Airbag systems employing such textile gas guides may include at least one inflatable cushion, a portion of which is coupled to the textile gas guide.

20 Claims, 7 Drawing Sheets

TEXTILE GAS GUIDES FOR USE WITH INFLATABLE CUSHIONS

TECHNICAL FIELD

The present disclosure relates generally to inflatable airbag cushions for motor vehicles. More specifically, various embodiments of the present disclosure relate to textile gas guides and methods of making textile gas guides used in inflatable airbag cushions for motor vehicles.

BACKGROUND

Modern motor vehicles typically employ various occupant protection systems that self-actuate from an undeployed to a deployed state without the need for intervention by the occupant. Such systems often include an inflatable occupant protection system in the form of a cushion or bag, commonly referred to as an "airbag cushion," which are now a legal requirement for many new vehicles. Such airbag cushions are typically installed in various locations in a vehicle and may deploy into one or more locations within the vehicle between the occupant and certain parts of the vehicle interior, such as the doors, steering wheel, instrument panel, dashboard or the like, to prevent or cushion the occupant from forcibly striking such parts of the vehicle interior.

Various types or forms of occupant protection systems have been developed or tailored to provide desired vehicle occupant protection based on either or both the position or placement of the occupant within the vehicle and the direction or nature of the vehicle collision. For example, driver and passenger inflatable cushion installations have found wide usage for providing protection to drivers and front seat passengers, respectively, in the event of a head-on type of collision. Other installations have found wide usage for providing protection to vehicle occupants in the event of a side impact (e.g., side collision, roll-over).

The airbag cushion is conventionally housed in an uninflated and folded condition to minimize space requirements. In the event of an accident, an accelerometer within the vehicle measures the abnormal deceleration and triggers the expulsion of rapidly expanding gases supplied or produced by a device commonly referred to as an "inflator." The expanding gases fill the airbags, which immediately inflate in front of the driver and/or passenger to protect them from impact against a windshield, dashboard, or other surfaces of the vehicle interior.

Such inflators may typically be attached to a gas guide for the airbag cushion. The gas guide may comprise a tube or other gas channel that directs the flow of the gas from the inflator into the airbag. Some conventional inflatable cushions often use a rigid gas guide, such as made from metal or plastic. Other conventional inflatable cushions may use a textile gas guide comprising a folded piece of material that is sewed along an edge to create a channel for the inflation gas. Such sewed seams on textile gas guides may, however, be subject to damage when gas from the inflator enters into and flows through the gas guide. Furthermore, such seams may be difficult to sew and may require specialized equipment during manufacturing.

BRIEF SUMMARY

Various embodiments of the present disclosure comprise textile gas guides for use with an airbag cushion. Such textile gas guides are formed in a manner to reduce or eliminate the need for specialized equipment during manufacturing and are sufficiently reinforced to withstand damage caused by gas flowing into the gas guide from an inflator. In one or more embodiments, a textile gas guide may include a first fabric member including a first edge and a second edge. A second fabric member may at least substantially encompass the first fabric member. The second fabric member may include a third edge positioned to overlap a portion of the second edge of the first fabric member. The third edge of the second fabric member may be coupled to the second edge of the first fabric member with a first seam sewed through the second edge of the first fabric member and the third edge of the second fabric member, the first seam being formed as a shear seam. The second fabric member may further include a fourth edge coupled to its third edge with a second seam sewed through the third edge and the fourth edge. The second seam may be formed as either a shear seam or a peel seam.

Additional embodiments of the present disclosure include inflatable airbag systems including a textile gas guide. According to at least one embodiment, such systems may comprise an inflatable cushion having an inflation throat receiving the textile gas guide disposed at least partially therein. The textile gas guide may comprise a first fabric member including a first edge and a second edge. A second fabric member may at least substantially encompass the first fabric member. The second fabric member may include a third edge positioned to overlap a portion of the second edge of the first fabric member. The third edge of the second fabric member may be coupled to the second edge of the first fabric member with a first seam sewed through the second edge of the first fabric member and the third edge of the second fabric member, the first seam being formed as a shear seam. The second fabric member may further include a fourth edge coupled to its third edge with a second seam sewed through the third edge and the fourth edge. The second seam may be formed as either a shear seam or a peel seam Yet other embodiments of the present disclosure comprise methods of making a textile gas guide. One or more embodiments of such methods may include coupling a second edge of a first fabric member to a third edge of a second fabric member with a first seam sewed through the second edge of the first fabric member and the third edge of the second fabric member. The first seam is formed as a shear seam. A fourth edge of the second fabric member may be coupled to the third edge of the second fabric member with a second seam sewed through the third edge and the fourth edge of the second fabric member. The second seam may be formed as either a shear seam or a peel seam. The second fabric member may be inverted so that the first fabric member is at least substantially encompassed by the second fabric member.

BRIEF DESCRIPTION OF THE SEVERAL VIEWS OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

The illustrations presented herein are, in some instances, not actual views of any particular textile gas guide or inflatable airbag system, but are merely idealized representations which are employed to describe the present disclosure. It is noted that although the embodiments illustrated herein are shaped as midfill gas guides, it will be understood that the various features described herein may apply to all forms of textile gas guides, including endfill, midfill, reverse flow, or any other known type of textile gas guides. Additionally, elements common between figures may retain the same numerical reference designation.

Various embodiments of the present disclosure include textile gas guides and methods of making textile gas guides adapted for use with an inflatable cushion. FIGS. 1-12 illustrate various embodiments of textile gas guides at various stages of assembly. Beginning at FIG. 1, a layout view of a first fabric member 102 and a second fabric member 104 used in forming the textile gas guide 100 is shown according to at least one embodiment. The first fabric member 102 and second fabric member 104 may be coated, uncoated, woven, unwoven, synthetic, or natural fabric, or film.

Figure 1:
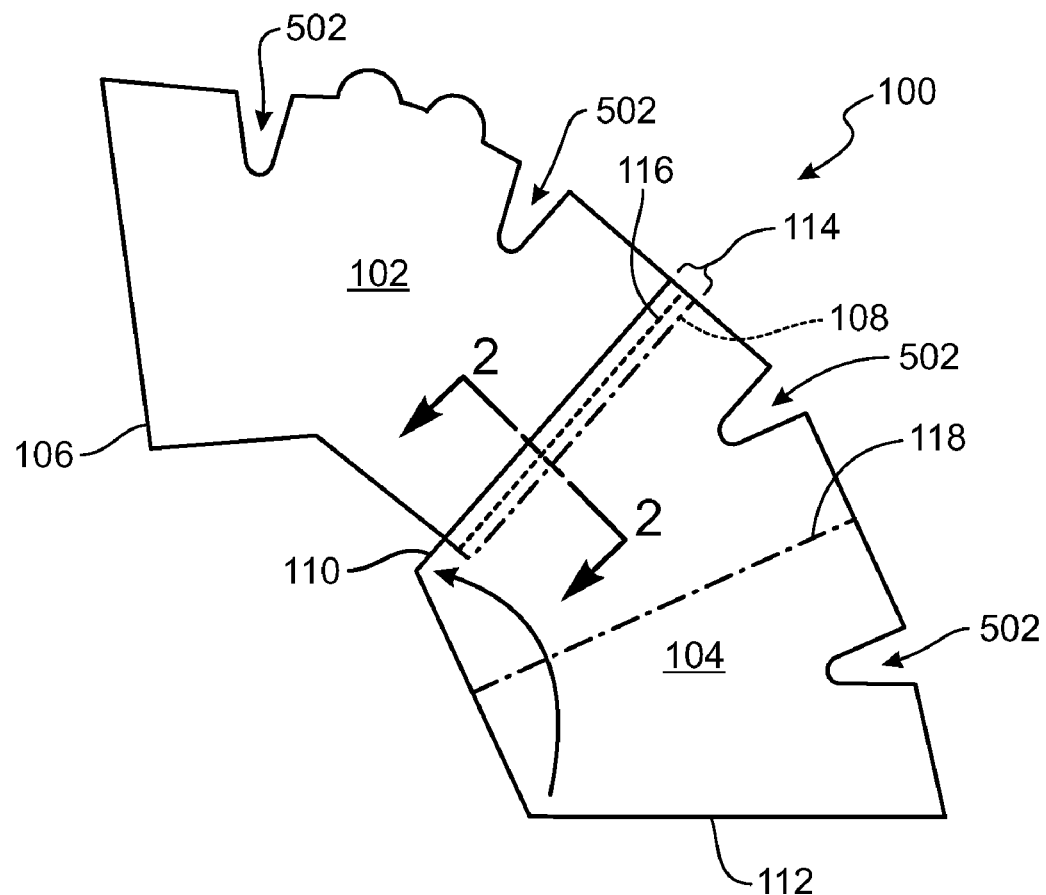
FIG. 1 is a layout view of a first fabric member and a second fabric member used in forming a textile gas guide according to at least one embodiment.
Figure 2:
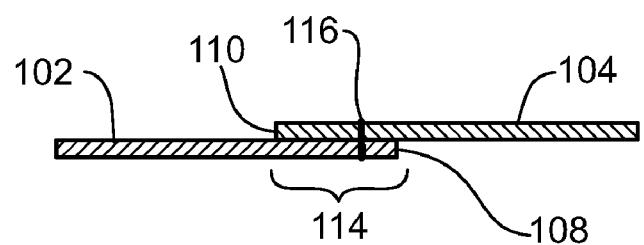
FIG. 2 is a partial cross-sectioned view of the first fabric member and second fabric member of FIG. 1 taken at 2-2 of FIG. 1.

The first fabric member 102 includes a first edge 106 and a second edge 108. The second fabric member 104 includes a third edge 110 and a fourth edge 112. The second edge 108 is shown in FIG. 1 by a broken line to illustrate that the second edge 108 of the first fabric member 102 subtends a portion of the third edge 110 of the second fabric member 104. That is, the third edge 110 of the second fabric member 104 overlaps a portion of the second edge 108 of the first fabric member 102 to define an overlapping region 114, as seen more clearly in FIG. 2, which is a partial cross-sectioned view of the first fabric member 102 and second fabric member 104 taken at 2-2 of FIG. 1 along the overlapping region 114.

With the third edge 110 of the second fabric member 104 overlapping the second edge 108 of the first fabric member 102, a first seam 116 may be sewed through the overlapping region 114. That is, the second edge 108 of the first fabric member 102 may be coupled to the third edge 110 of the second fabric member 104 by the first seam 116. The first seam 116 is formed as a shear seam. As used herein, a shear seam includes a seam that may be formed by two edges coupled together in overlapping fashion. In other words, a shear seam may be defined by a seam formed through two portions coupled together so that a front or obverse surface of one portion is disposed adjacent a rear or reverse surface of the other portion, as shown clearly in FIG. 2. Such a seam is under shear stress when the gas guide 100 is inflated. Specifically, when inflated, the gas will push outwardly against the fabric. A component of this force pushes outwardly and attempts to get the overlapped region 114 to "un-overlap." At the same time, a portion of the gas pressing outwardly against the fabric also presses outwardly against the overlapping region 114. Such pressure presses the two edges forming the overlapping region 114 together. This component of the force may strengthen the first seam 116. Accordingly, this shear stress is less likely to cause the seam 116 to fail than is tensile stress. In other words, the first seam 116 will actually be stronger, more robust and less likely to fail. As such, the seam 116 can withstand greater inflation pressures. Examples of such shear seams are described in U.S. patent application Ser. No. 12/154,751, the entire disclosure of which is incorporated herein by this reference. In contrast to the incorporated U.S. patent application, however, the seam 116 may be formed with the first fabric member 102 and the second fabric member 104 laid out, such that there is no need for a needle or a bobbin used for sewing the seam to be located inside the gas guide.

The first seam 116 may be stitching of similar or different thread weights. The first seam 116 may be any of a variety of different stitch types, such as lock, chain, other types known in the art, or a combination thereof. The first seam 116 may be a single row of stitching or may be multiple rows of stitching. Moreover, other embodiments may be designed which incorporate glue, adhesives, or other attachment mechanisms rather than, or in addition to stitching or sewing.

Figure 3:
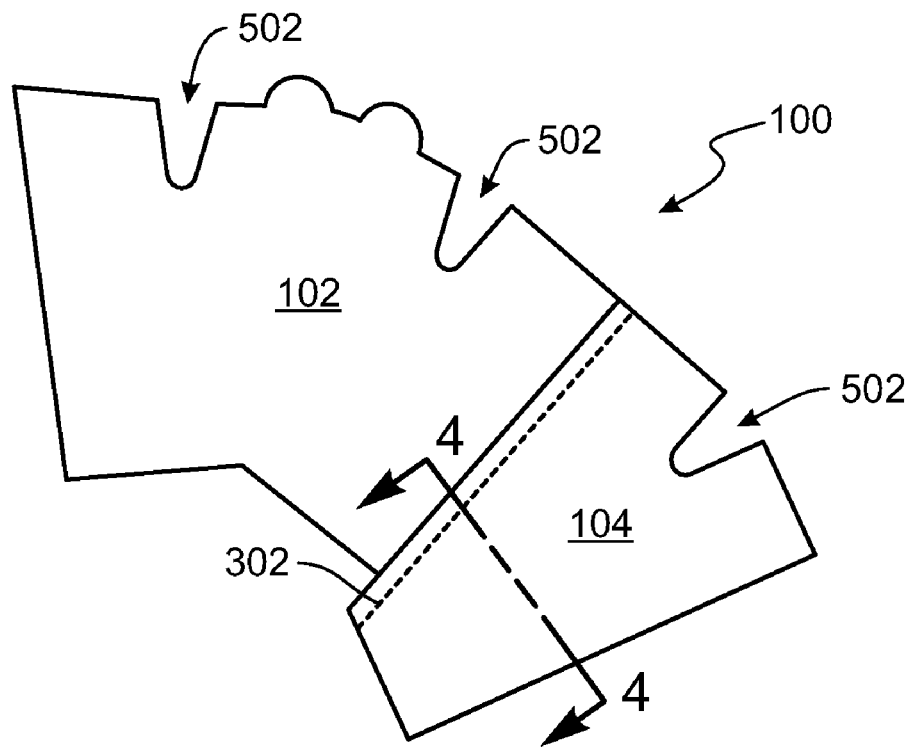
FIG. 3 shows a layout view of the textile gas guide of FIG. 1 with the edge of the second fabric member folded over toward the third edge of the second fabric member.

After the first seam 116 is formed, the fourth edge 112 of the second fabric member 104 may be folded over toward the third edge 110 of the second fabric member 104, about an axis 118 as illustrated by the arrow in FIG. 1. FIG. 3 shows a layout view of the textile gas guide 100 with the second fabric member 104 folded as just described. With the second fabric member 104 coupled to the first fabric member 102 and folded, the fourth edge 112 of the second fabric member 104 may be coupled to the third edge 110 of the second fabric member with a second seam 302 sewed through the third edge 110 and the fourth edge 112 of the second fabric member 104. Similar to the first seam 116, the second seam 302 may be any of a variety of different stitch types, such as lock, chain, other types known in the art, or a combination thereof. The second seam 302 may be a single row of stitching or may be multiple rows of stitching. Moreover, other embodiments may be designed which incorporate glue, adhesives, or other attachment mechanisms rather than, or in addition to stitching or sewing.

Figure 4:
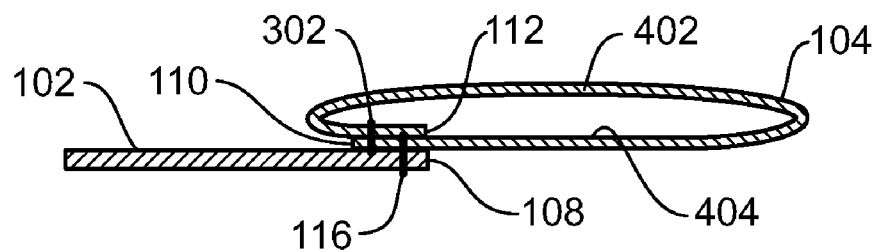
FIG. 4 shows partial cross-sectioned view of the first fabric member and second fabric member taken at 4-4 of FIG. 3 according to an embodiment in which the second seam is formed as a shear seam.

According to various implementations, the second seam 302 may be formed as a shear seam, similar to the first seam 116. FIG. 4 shows partial cross-sectioned view of the first fabric member 102 and second fabric member 104 taken at 4-4 of FIG. 3 according to an embodiment in which the second seam 302 is formed as a shear seam. As illustrated in FIG. 4, to form the second seam 302 as a shear seam, the fourth edge 112 of the second fabric member 104 may overlap the third edge 110, similar to the seams described in U.S. patent application Ser. No. 12/154,751 referenced above. That is, an outer surface 402 of the second fabric member 104 at the fourth edge 112 may be positioned toward an inner surface 404 of the second fabric member 104 at the third edge 110, and the second seam 302 may be sewed through the third and fourth edges 110, 112. In other implementations, the outer surface 402 at the third edge 110 may be positioned toward the inner surface 404 at the fourth edge 112. Forming the second seam 302 as a shear seam may provide increased strength, as noted above with reference to the first seam 116.

As shown in FIG. 4, the second seam 302 is formed nearer to the third edge 110 of the second fabric member 104 than the first seam 116. Accordingly, the first fabric member 102 extending from the first seam 116 may cover at least a portion of the second seam 302. As will be shown in more detail below, the first fabric member 102 may accordingly provide a protective layer shielding the second seam 302 from damage.

Figure 5:
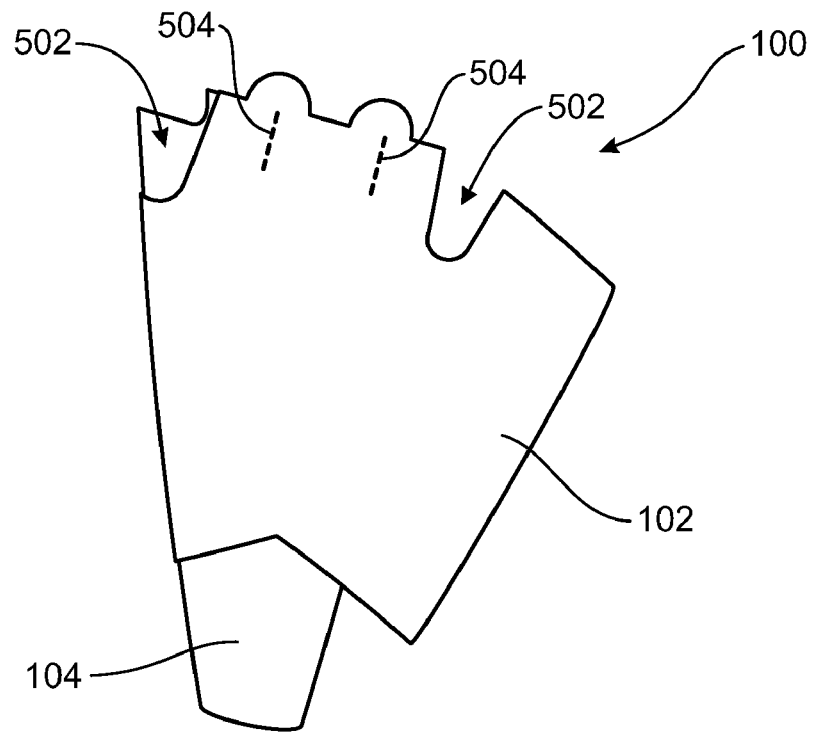
FIG. 5 shows a layout view of the textile gas guide of FIG. 4 with the first fabric member folded around a portion of the second fabric member, according to at least one embodiment.

With the second seam 302 formed, the first fabric member 102 may be wrapped around at least a portion of the second fabric member 104, as illustrated in FIG. 5. According to one feature, the first fabric member 102 may have a length from the first edge 106 (shown in FIG. 1) to the second edge 108 (shown in FIG. 1) that is sufficient to wrap all the way around the folded second fabric member 104 and to at least partially overlap itself to cover the first seam 116. That is, when the first fabric member 102 is wrapped around the second fabric member 104, at least a portion of the first seam 116 and the second seam 302 (shown in FIGS. 3 and 4) may be covered by the first fabric member 102. If the first and second fabric members 102, 104 include one or more notches 502, such notches 502 may be aligned when the first fabric member 102 is wrapped around the second fabric member 104. One or more tack seams 504 may be sewed through the first fabric member 102 and second fabric member 104 to hold the wrapped first fabric member 102 in place around the second fabric member 104.

Figure 6:
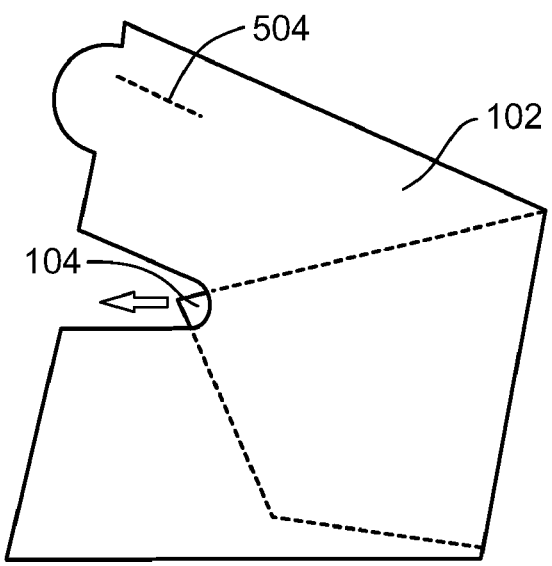
FIG. 6 illustrates the gas guide of FIG. 5 in the act of being inverted to place the second fabric member outside of and around the first fabric member.

FIG. 6 illustrates the gas guide 100 of FIG. 5 in the act of being inverted. In particular, with the first fabric member 102 disposed around the second fabric member 104, the entire assembly may be inverted so that the first fabric member 102 is located inside of the second fabric member 104 and the second fabric member 104 is located outside of and disposed around the first fabric member 102. In effect, the gas guide 100 is turned inside out.

Figure 7:
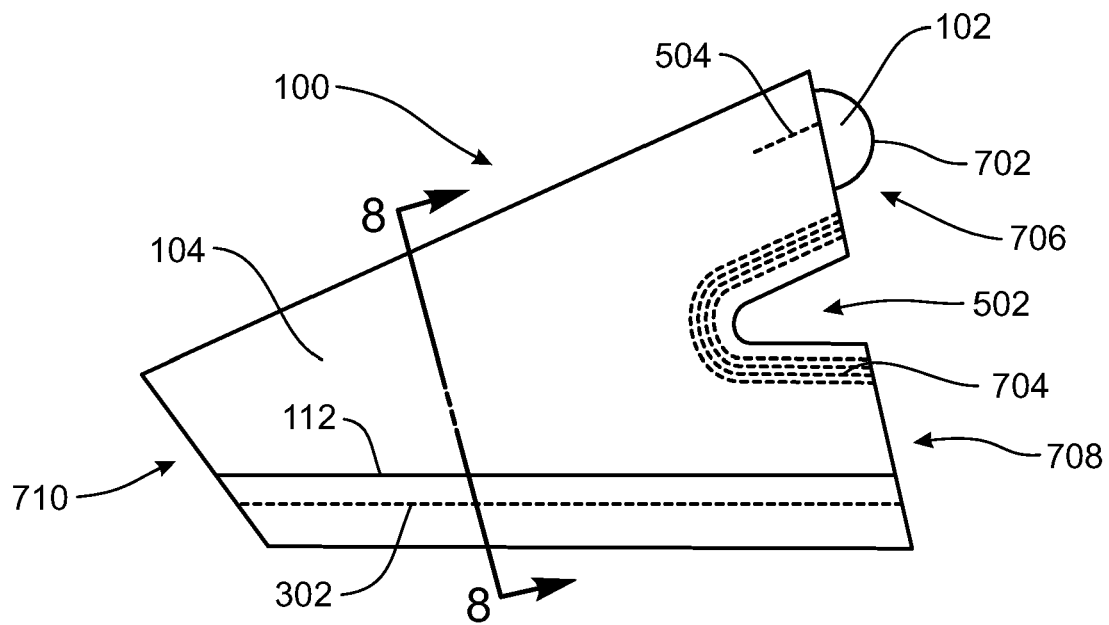
FIG. 7 is a side view of the gas guide of FIG. 6 after being inverted.

FIG. 7 is a side view of the gas guide 100 after the gas guide 100 has been inverted (i.e., turned inside out). As shown, the second fabric member 104 at least substantially surrounds the first fabric member 102, and only tabs 702 of the first fabric member 102 are visible in the orientation illustrated. Tabs 702, if present, may be used for positioning an inflator within the gas guide 100. As noted previously, gas guide 100 is depicted as a midfill gas guide. As such, various features may be included, which may not be included in other applicable gas guides. For example, a third seam 704 may be sewed around the notches 502 pinching a portion of the gas guide 100 together to form an upper opening 706 and a lower opening 708. The third seam 704 may create a y-shaped channel between the upper opening 706, the lower opening 708 and an opposing opening 710. In this embodiment, the upper opening 706 would serve as the inlet and opposing opening 710 and lower opening 708 would both serve as outlets.

The third seam 704 is illustrated as having four rows of stitching. However, the third seam 704 may include any number of rows of stitching, may utilize any stitching type, and any thread material and weight and any form of adhesive. Of course, other methods of attaching or joining may be used to attach such as glue, sealant, silicone, thread, etc., as well as a combination of two or more. For example, silicon or other adhesive may be used to fasten the inflator to the Y-sock or I-sock or other type of sock (such as a twistable sock). Thus, by using the term "sewing" or "stitching" herein, all types of attachment methods are contemplated.

Figure 8:
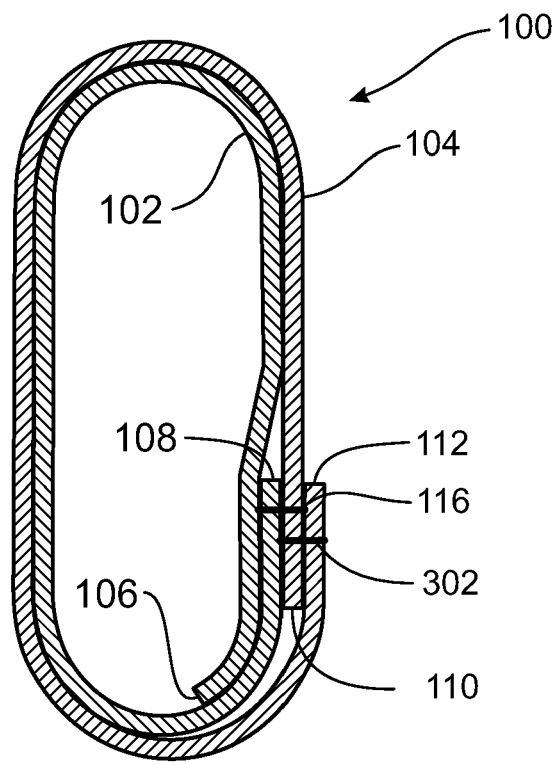
FIG. 8 is a cross-sectioned view of the gas guide of FIG. 7 taken at 8-8 in FIG. 7.

The second seam 302 is visible in FIG. 7 as well as the fourth edge 112 of the second fabric member 104 that is overlapping the third edge to form the shear seam defining the second seam 302, as described above with reference to FIG. 4. FIG. 8 is a cross-sectioned view of the gas guide 100 taken at 8-8 in FIG. 7. As shown, the second fabric member 104 includes the third edge 110 coupled to the fourth edge 112 with a second seam 302 formed as a shear seam. The second fabric member 104 at least substantially encompasses the first fabric member 102. The third edge 110 of the second fabric member is also coupled to the second edge 108 of the first fabric member 106 to form the first seam 116, which is configured as a shear seam. The first fabric member 102 extends from its second edge 108 over the second seam 302 and around the interior circumference of the cavity formed by the gas guide 100 to at least substantially cover the second seam 302 and the second fabric member 104. By covering the second seam 302 and the inside surface of the second fabric member 104, the first fabric member 102 provides a reinforcing layer to the second fabric member 104, protecting the second fabric member 104 and, more particularly, the second seam 302 from damage which may result from the introduction of a gas generated during deployment and inflation of the gas guide 100. That is, as gas generated by an aribag inflator (not shown) enters the gas guide 100, the first fabric member 102 provides a reinforcing layer to the second seam 302 to protect the second seam 302 from damage by the gas, which damage may potentially lead to subsequent gas leakage. Furthermore, as noted above, the first fabric member 102 may be sized sufficiently large to wrap around the interior of the gas guide 100, such that the first edge 106 of the first fabric member 102 is positioned beyond the first seam 116, resulting in the first fabric member covering the first seam 116 and protecting the first seam 116 in a manner similar to how the first fabric member 102 provides protection for the second seam 302.

According to another embodiment, the second seam may be formed as a peel seam (e.g., a seam subject to tensile stress when the gas guide is inflated). Forming the second seam as a peel seam increases the ease with which a gas guide having various features of the present disclosure may be manufactured. For example, by forming the second seam as a peel seam, such a gas guide may be formed without the need for specialized equipment adapted to enable a needle or a bobbin to be located inside the second fabric members, as will be apparent from the description provided below. Increasing the ease of manufacturing may result in a substantial reduction in manpower and/or cycle time during the manufacturing process. Furthermore, the peel seam used with gas guides of the present disclosure retain substantial strength as a result of the protection afforded by the first fabric member, as described herein below.

For embodiments of a gas guide including a second seam formed as a peel seam, the first fabric member 102 and the second fabric member 104 may be coupled together as described above with reference to FIGS. 1 and 2. In particular, the third edge 110 of the second fabric member 104 is disposed on top of a portion of the second edge 108 of the first fabric member 102 and the third edge 110 of the second fabric member 104 may be coupled to the second edge 108 of the first fabric member 102 by a first seam 116, the first seam 116 being formed as a shear seam.

Figure 9:
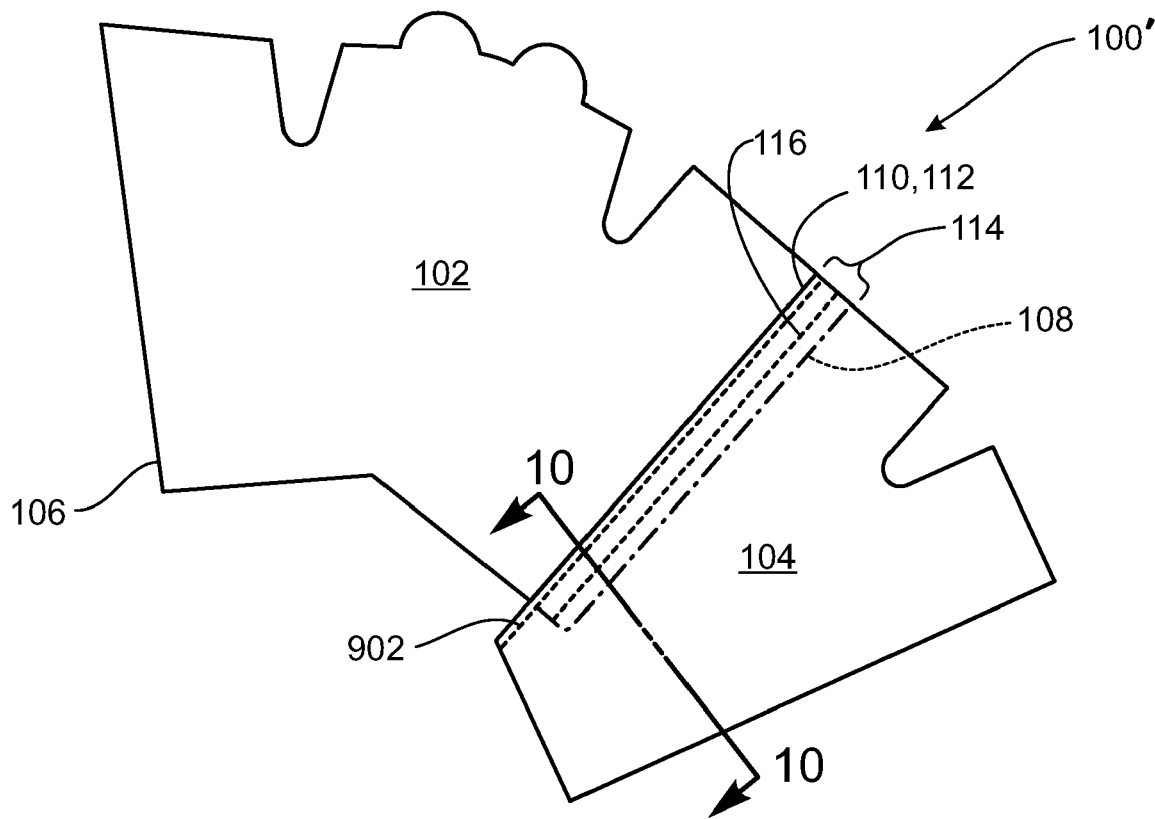
FIG. 9 shows a layout view of the textile gas guide of FIG. 1 with fourth edge of the second fabric member folded over toward the third edge of the second fabric member.

After the first seam 116 is formed, the fourth edge 112 of the second fabric member 104 may be folded over toward the third edge 110 of the second fabric member 104, about an axis 118 as illustrated by the arrow in FIG. 1. FIG. 9 shows a layout view of the textile gas guide 100' with the second fabric member 104 folded as just described. With the second fabric member 104 coupled to the first fabric member 102 and folded, the fourth edge 112 of the second fabric member 104 may be coupled to the third edge 110 of the second fabric member with a second seam 902 sewed through the third edge 110 and the fourth edge 112 of the second fabric member 104. Similar to the first seam 116, the second seam 902 may be any of a variety of different stitch types, such as lock, chain, other types known in the art, or a combination thereof. The second seam 902 may be a single row of stitching or may be multiple rows of stitching. Moreover, other embodiments may be designed which incorporate glue, adhesives, or other attachment mechanisms rather than, or in addition to stitching or sewing.

Figure 10:
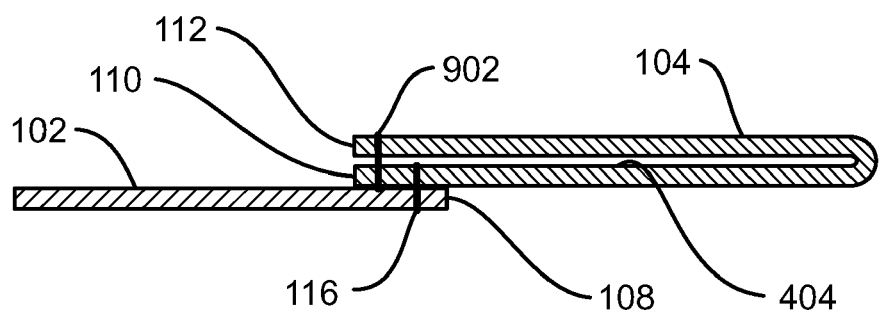
FIG. 10 shows partial cross-sectioned view of the first fabric member and second fabric member taken at 10-10 of FIG. 9 according to an embodiment in which the second seam is formed as a peel seam.

According to the implementation of FIG. 9, the second seam 902 may be formed as a peel seam. FIG. 10 shows partial cross-sectioned view of the first fabric member 102 and second fabric member 104 taken at 10-10 of FIG. 9 according to an embodiment in which the second seam 902 is formed as a peel seam, which may also be characterized as a tensile seam. As illustrated in FIG. 10, forming the second seam 902 as a peel seam may include folding the second fabric member 104 so that the inner surface 404 of the second fabric member 104 at both the third edge 110 and at the fourth edge 112 are positioned toward one another. The second seam 902 may then be sewed through the third and fourth edges 110, 112. Forming the second seam 902 as a peel seam may result in easier processing, since the third and fourth edges 110, 112 may be sewed together with the second fabric member 104 laid flat, such that there is no need for a needle or a bobbin used for sewing the seam to be located inside the second fabric member 104. Accordingly, both the first seam 116 and the second seam 902 may be sewed with greater ease and without the need for specialized and/or modified sewing equipment.

As shown in FIG. 10, the second seam 902 is formed nearer to the third edge 110 of the second fabric member 104 than the first seam 116. Accordingly, the first fabric member 102 extending from the first seam 116 may cover at least a portion of the second seam 902. As will be shown in more detail below, the first fabric member 102 may accordingly provide a protective layer shielding the second seam 902 from damage.

After forming the second seam 902 as a peel seam, the gas guide 100' may be processed in a manner similar to the gas guide 100. In particular, as described above with reference to FIGS. 5 and 6, the first fabric member 102 of the gas guide 100' may be disposed around at least a portion of the second fabric member 104, and one or more tack seams 504 (See FIG. 11) may be sewed through the first fabric member 102 and second fabric member 104 to hold the wrapped first fabric member 102 in place around the second fabric member 104. Furthermore, the gas guide 100' may be inverted (i.e., turned inside out) so that the first fabric member 102 is located inside of the second fabric member 104 and the second fabric member 104 is located outside of and disposed around the first fabric member 102.

Figure 11:
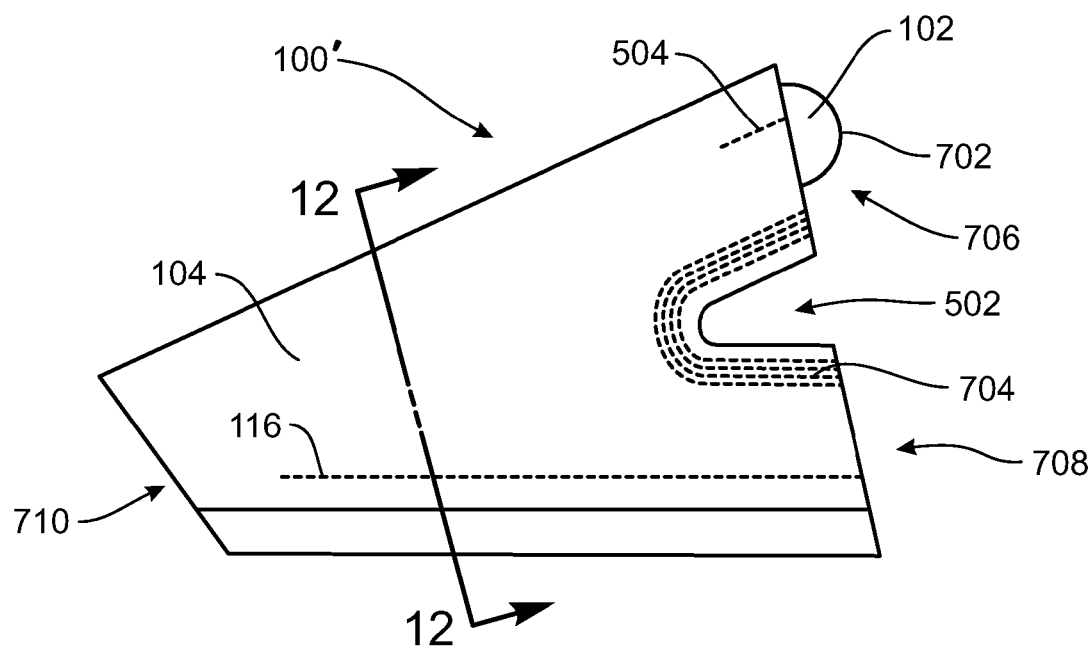
FIG. 11 is a side view of the gas guide of FIG. 10 after being inverted.

FIG. 11 is a side view of the gas guide 100' after the gas guide 100' has been inverted. As shown, the second fabric member 104 at least substantially surrounds the first fabric member 102, and only tabs 702, if present, of the first fabric member 102 may be visible in the orientation illustrated. Gas guide 100' is depicted as a midfill gas guide. As such, various features may be included that may not be included in other applicable gas guides. For example, as described with reference to FIG. 7 above, a third seam 704 may be sewed around the notches 502 pinching a portion of the gas guide 100' together to form an upper opening 706 and a lower opening 708. The third seam 704 may create a y-shaped channel between the upper opening 706, the lower opening 708 and an opposing opening 710. In this embodiment, the upper opening 706 would serve as the inlet and opposing opening 710 and lower opening 708 would both serve as outlets.

Figure 12:
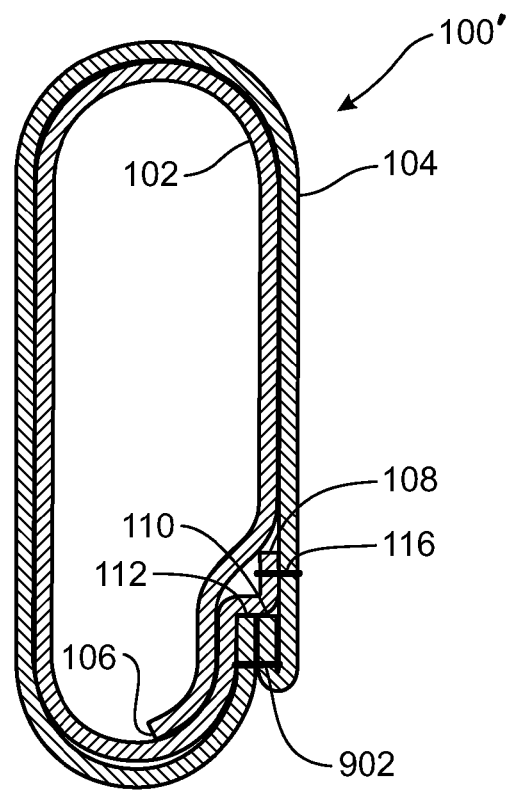
FIG. 12 is a cross-sectioned view of the gas guide of FIG. 11 taken at 12-12 in FIG. 11.

In embodiments of gas guide 100' in which the second seam 902 comprises a peel seam, the first seam 116 may be visible on the exterior surface of the second fabric member 104. FIG. 12 is a cross-sectioned view of the gas guide 100' taken at 12-12 in FIG. 11. As shown, the second fabric member 104 includes the third edge 110 coupled to the fourth edge 112 with a second seam 902 formed as a peel seam. The second fabric member 104 at least substantially encompasses the first fabric member 102. The third edge 110 of the second fabric member is also coupled to the second edge 108 of the first fabric member 106 to form the first seam 116, which is configured as a shear seam. The first fabric member 102 extends from its second edge 108 over the second seam 902 and around the interior circumference of the cavity formed by the gas guide 100' to at least substantially cover the second seam 902 and the second fabric member 104. By covering all or at least a substantial portion of the second seam 902 and the inside surface of the second fabric member 104, the first fabric member 102 provides a reinforcing layer to the second fabric member 104, protecting the second fabric member 104 and, more particularly, the second seam 902 from damage which may result from the introduction of gas generated during deployment and inflation of the gas guide 100'. That is, as gas generated by an airbag inflator (not shown) enters the gas guide 100', the first fabric member 102 provides a reinforcing layer to the second seam 902 to protect the second seam 902 from damage by the gas, which damage may potentially lead to subsequent gas leakage. Furthermore, as noted above, the first fabric member 102 may be sized sufficiently large to wrap around the interior of the gas guide 100', such that the first edge 106 of the first fabric member 102 is positioned beyond the first seam 116, resulting in the first fabric member 102 covering the first seam 116 and protecting the first seam 116 in a manner similar to how the first fabric member provides protection for the second seam 902.

Figure 13:
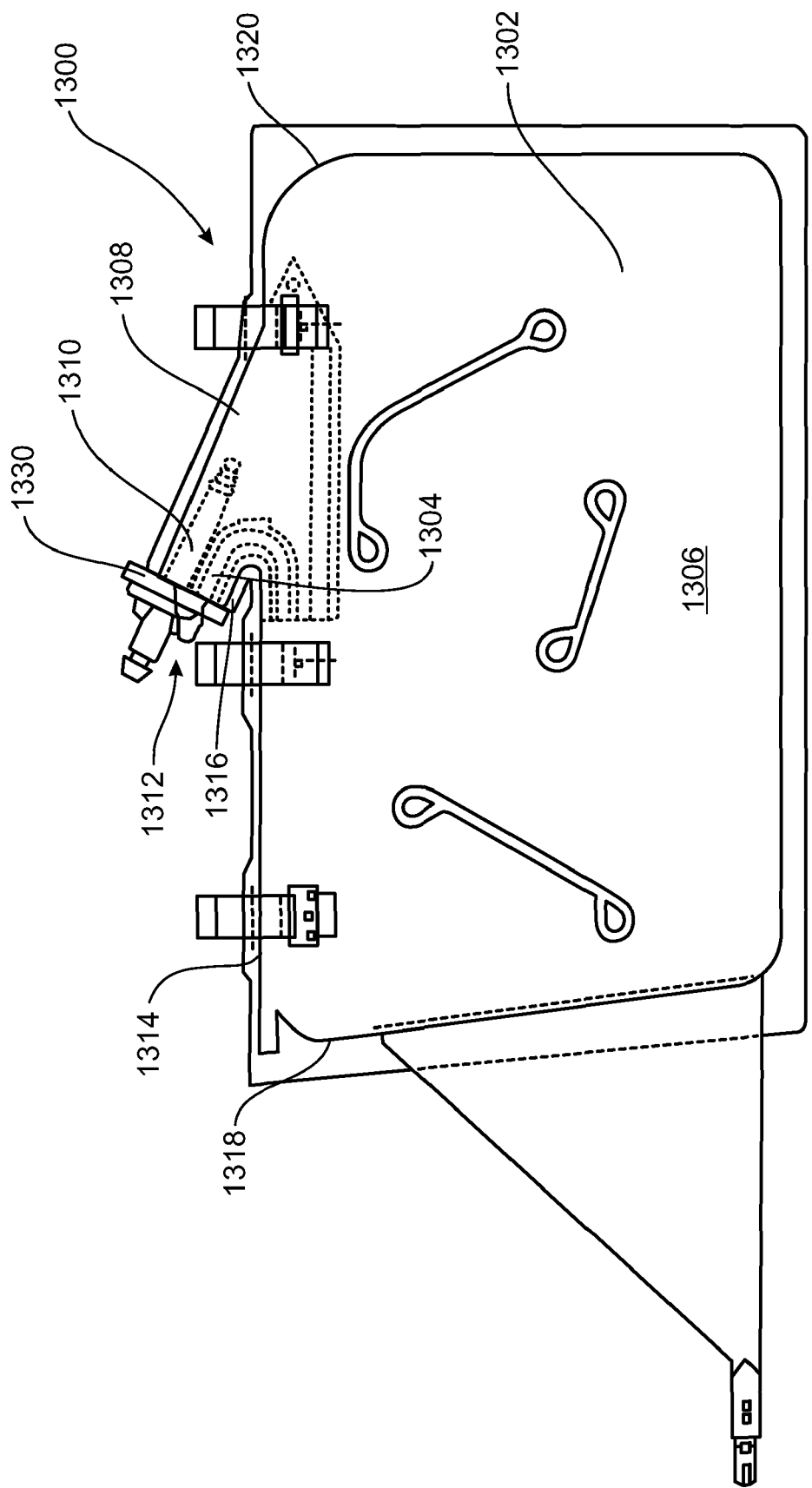
FIG. 13 is a side view of select components of an airbag system according to at least one embodiment.

Additional embodiments of the present disclosure relate to inflatable airbag systems employing textile gas guides, such as the textile gas guide 100, 100' described above. FIG. 13 illustrates a side view of select components of an airbag system 1300 according to at least one embodiment. The airbag system 1300 includes an inflatable cushion 1302. The inflatable cushion 1302 may include an inflation throat 1304 and a main body 1306. The inflatable airbag system 1300 may include textile gas guide 1308 (shown mostly in phantom). Textile gas guide 1308 may be configured according to the various features described herein above with reference to the textile gas guides 100 or 100'. The airbag system 1300 may include an inflator 1310 (shown in phantom for clarity) disposed at least partially within the textile gas guide 1308.

At least a portion of the textile gas guide 1308 may be located within the inflation throat 1304. The inflation throat 1304 is the portion of the inflatable cushion 1302 that receives the gas produced by the inflator. The inflation throat 1304 then directs the gas into the inflatable areas of the inflatable cushion 1302.

In one embodiment, an upper opening 1312 of the textile gas guide 1308 may extend beyond the inflation throat 1304 while the remainder of the textile gas guide 1308 may be located within the inflation throat 1304 and the main body 1306. The inflator 1310 may be inserted within the upper opening 1312 of the textile gas guide 1308. The inflator 1310 may be axially in line with the upper opening 1312 and the inflation throat 1304. The inflator 1310 may also be parallel with a top edge 1314 of inflatable cushion 1302.

In one embodiment, the inflation throat 1304 may be located along any outer edge of the inflatable cushion 1302. For example, the inflation throat 1304 may be generally (i.e., substantially or all or a portion) in a recess 1316. The recess 1316 may be centrally located along the top edge 1314 of the inflatable cushion 1302, relative to when the inflatable cushion 1302 is in an unfolded state. The inflation throat 1304 may be orientated generally (i.e., substantially) parallel to the top edge 1314 of the inflatable cushion 1302. The inflation throat 1304 may extend along or beneath the top edge 1314 of the inflatable cushion 1302. In another example, the inflation throat 1304 may be located at either corner 1318 or corner 1320 of the inflatable cushion 1302.

Generally speaking, when the inflation throat 1304 is centrally located along an outer edge, such as in the recess 1316, then a midfill gas guide may be used, such as textile gas guides 100 or 100'. When the inflation throat 1304 is located at a corner, such as corner 1318 or 1320, then an endfill gas guide may be used. However, it should be understood that the embodiments of the present disclosure are not limited to that general rule. Other embodiments may be designed in which the inflation throat 1304 is an extension that is positioned above the inflatable cushion 1302 and directs the gas downwards (or substantially downward) into the inflatable cushion 1302.

The inflatable cushion 1302 is depicted as having a generally rectangular shape and a single compartment. The inflatable cushion 1302 may have a variety of shapes, multiple compartments, and multiple inflators utilizing variations of textile gas guides 1308 (e.g., textile gas guides 100 and 100' and other variations). The inflatable cushion 1302 may be made using one-piece weaving, by having two (2) fabric layers cut and sewed, or by having two (2) fabric layers cut, sealed and then sewed.

The textile gas guide 1308 may be sewed to the inflatable cushion 1302. Tack stitches (not shown) may be used in sewing the textile gas guide 1308 to the inflatable cushion 1302. The textile gas guide 1308 may include one or more positioning holes for aiding in positioning the textile gas guide 1308 within the inflation throat 1304 and the main body 1306 prior to sewing the textile gas guide 1308 to the inflatable cushion 1302. The positioning holes can also assist in positioning the inflator 1310 within the textile gas guide 1308.

The airbag system 1300 may also include a clamp 1330 for securing together the inflator 1310, the textile gas guide 1308, and the inflation throat 1304. In at least one embodiment, the clamp 1330 may be a ring clamp. The airbag system 1300 may be an inflatable curtain, also known as a side-impact airbag. The airbag system 1300 may include multiple inflatable cushions 1302. The airbag system 1300 may utilize multiple textile gas guides 1308, as well as variations thereof.

The various embodiments of the present disclosure result in textile gas guides that are formed to reinforce the seams from damage and that may be formed with less use or no use of specialized equipment. Such textile gas guides substantially reduce the costs associated with forming conventional textile gas guides having one or more shear seams since they are substantially easier and cheaper to manufacture.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A textile gas guide for use with an inflatable cushion, comprising:
    a first fabric member including a first edge and a second edge; and
    a second fabric member at least substantially encompassing the first fabric member, the second fabric member including:
        a third edge positioned to overlap a portion of the second edge of the first fabric member and coupled to the second edge of the first fabric member with a first seam sewed through the second edge of the first fabric member and the third edge of the second fabric member, the first seam being formed as a shear seam; and
        a fourth edge coupled to the third edge of the second fabric member with a second seam sewed through the third edge and the fourth edge of the second fabric member; and
    wherein the first fabric member is disposed inside of the second fabric member to protect the first seam and the second seam when a gas is introduced inside the gas guide.

2. The textile gas guide of claim 1, wherein the second seam sewed through the third edge and the fourth edge of the second fabric member is formed as a shear seam.

3. The textile gas guide of claim 1, wherein the second seam sewed through the third edge and the fourth edge of the second fabric member is formed as a peel seam.

4. The textile gas guide of claim 1, wherein the first fabric member at least substantially covers the second seam sewed through the third edge and the fourth edge of the second fabric member.

5. The textile gas guide of claim 4, wherein the first fabric member further covers the first seam sewed through the second edge of the first fabric member and the third edge of the second fabric member.

6. A textile gas guide for use with an inflatable cushion, comprising:
    a first fabric member including a first edge and a second edge; and
    a second fabric member at least substantially encompassing the first fabric member, the second fabric member including:
        a third edge positioned to overlap a portion of the second edge of the first fabric member and coupled to the second edge of the first fabric member with a first seam sewed through the second edge of the first fabric member and the third edge of the second fabric member, the first seam being formed as a shear seam; and
        a fourth edge coupled to the third edge of the second fabric member with a second seam sewed through the third edge and the fourth edge of the second fabric member; and wherein the first fabric member at least substantially covers the second seam sewed through the third edge and the fourth edge of the second fabric member, wherein the first fabric member further covers the first seam sewed through the second edge of the first fabric member and the third edge of the second fabric member.

7. An inflatable airbag system, comprising:
an inflatable cushion including an inflation throat;
a textile gas guide disposed at least partially within the inflation throat of the inflatable cushion, the textile gas guide comprising:
a first fabric member including a first edge and a second edge; and
a second fabric member at least substantially encompassing the first fabric member, the second fabric member including:
a third edge positioned to overlap a portion of the second edge of the first fabric member and coupled to the second edge of the first fabric member with a first seam sewed through the second edge of the first fabric member and the third edge of the second fabric member, the first seam being formed as a shear seam; and
a fourth edge coupled to the third edge of the second fabric member with a second seam sewed through the third edge and the fourth edge of the second fabric member; and
an inflator disposed at least partially within the textile gas guide.

8. The inflatable airbag system of claim 7, wherein the second seam sewed through the third edge and the fourth edge of the second fabric member is formed as a shear seam.

9. The inflatable airbag system of claim 7, wherein the second seam sewed through the third edge and the fourth edge of the second fabric member is formed as a peel seam.

10. The inflatable airbag system of claim 7, wherein the first fabric member at least substantially covers the second seam sewed through the third edge and the fourth edge of the second fabric member.

11. The inflatable airbag system of claim 10, wherein the first fabric member further covers the first seam sewed through the second edge of the first fabric member and the third edge of the second fabric member.

12. The inflatable airbag system of claim 7, further comprising an inflator coupled to the textile gas guide.

13. The inflatable airbag system of claim 7, wherein the textile gas guide comprises one of a endfill, midfill or reverse flow gas guide.

14. A method of making a textile gas guide, comprising:
coupling a second edge of a first fabric member to a third edge of a second fabric member with a first seam sewed through the second edge of the first fabric member and the third edge of the second fabric member, the first seam being formed as a shear seam;
coupling a fourth edge of the second fabric member to the third edge of the second fabric member with a second seam sewed through the third edge and the fourth edge of the second fabric member; and
inverting the second fabric member so the first fabric member is at least substantially encompassed by the second fabric member.

15. The method of claim 14, wherein coupling the fourth edge of the second fabric member to the third edge of the second fabric member with a second seam comprises coupling the fourth edge of the second fabric member to the third edge of the second fabric member with a second seam formed as a shear seam.

16. The method of claim 14, wherein coupling the fourth edge of the second fabric member to the third edge of the second fabric member with a second seam comprises coupling the fourth edge of the second fabric member to the third edge of the second fabric member with a second seam formed as a peel seam.

17. The method of claim 16, wherein coupling the fourth edge of the second fabric member to the third edge of the second fabric member with a second seam formed as a peel seam comprises sewing the second seam with the second fabric member laid flat.

18. The method of claim 16, wherein coupling the fourth edge of the second fabric member to the third edge of the second fabric member with a second seam formed as a peel seam comprises sewing second seam without one of a needle or a bobbin located inside of the second fabric member.

19. The method of claim 14, further comprising disposing the first fabric member to at least substantially cover the second seam sewed through the third edge and the fourth edge of the second fabric member.

20. The method of claim 19, further comprising disposing the first fabric member to at least substantially cover the first seam sewed through the second edge of the first fabric member and the third edge of the second fabric member.

* * * * *